Dec. 6, 1966  J. H. DAMIANI  3,290,085
CAMPER BED
Filed June 29, 1964  2 Sheets-Sheet 1
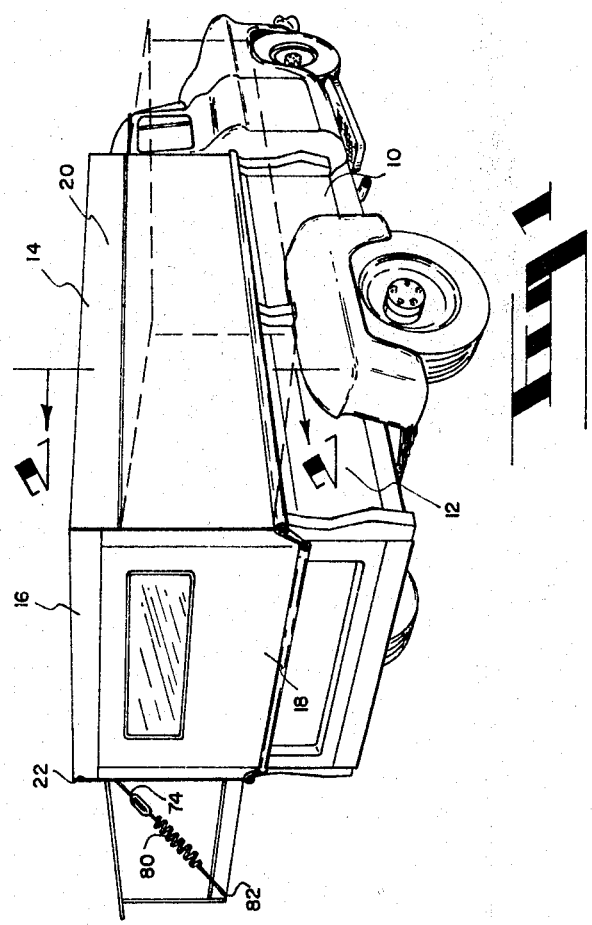
INVENTOR.
JOHN H. DAMIANI
BY
Wm. H. Dean Dec. 6, 1966   J. H. DAMIANI   3,290,085
CAMPER BED
Filed June 29, 1964   2 Sheets-Sheet 2
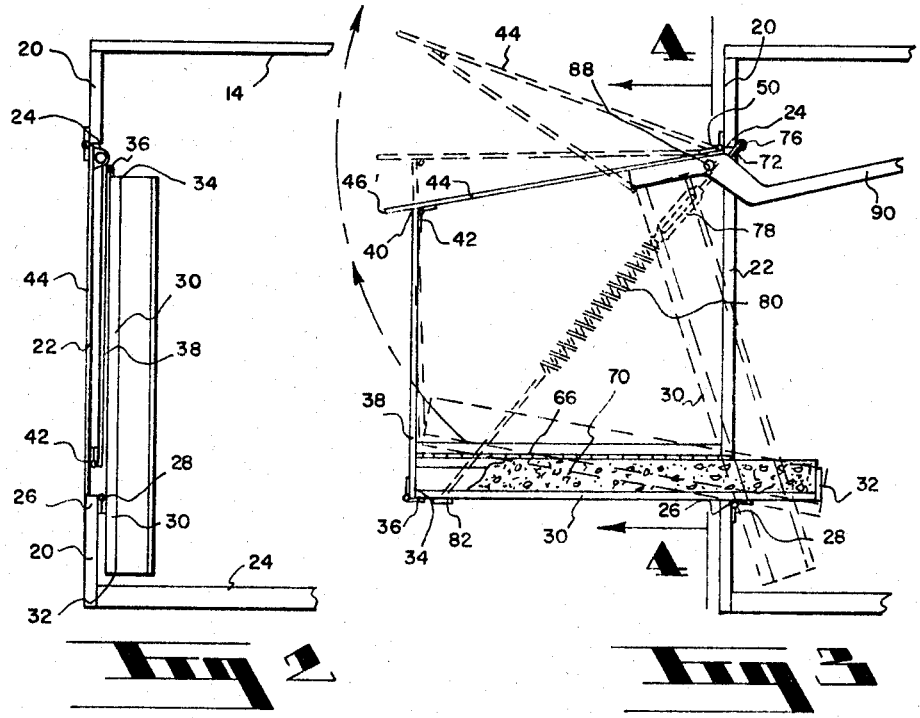
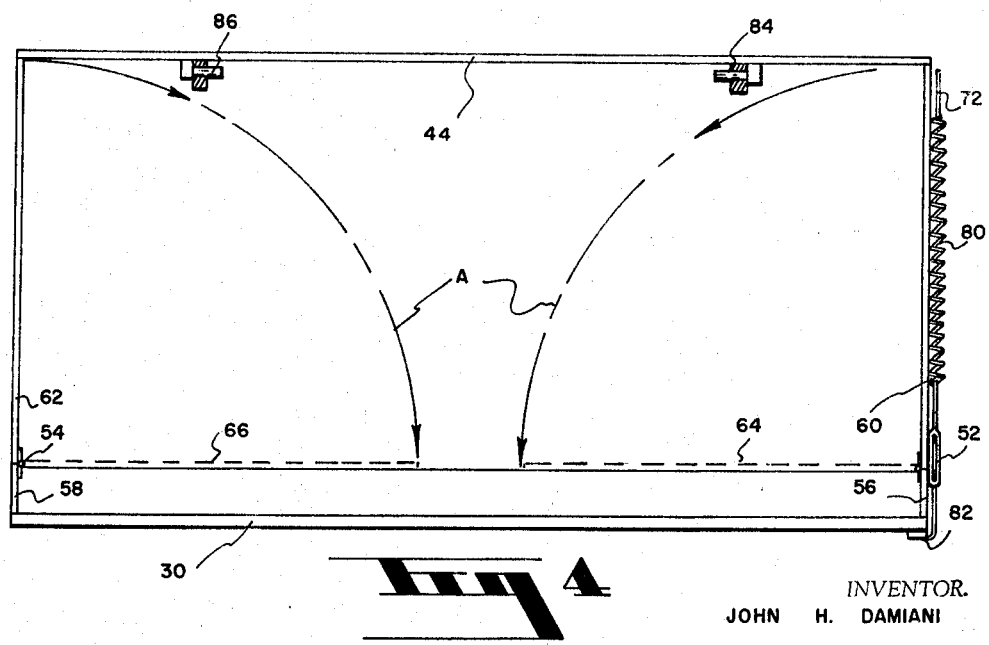
INVENTOR.
JOHN  H.  DAMIANI
BY

United States Patent Office 3,290,085
Patented Dec. 6, 1966

3,290,085
CAMPER BED
John H. Damiani, 425 Sierra St., El Segundo, Calif.
Filed June 29, 1964, Ser. No. 378,756
2 Claims. (Cl. 296—23)

This invention relates to a foldable vehicle body and bed construction, and more particularly, to a foldable vehicle body and bed construction for use in connection with pickup trucks, trailers, or other vehicles wherein an extension of the vehicle body is desirable for use in providing sleeping quarters or other space extensions.

Various convertible vehicles disclosed in the prior art employ vehicle bodies having extendable portions and particularly extendable bed structures which also comprise roof and wall enclosures for the extendable bed structures.

Many foldable vehicle body and bed structures for vehicles have been utilized, but many of them are so constucted that when extendable bed and wall structures are retacted into the vehicle body they take up a substantial amount of room internally of the vehile body. Additionally, many of the prior art structures devoted to foldable extension of bed or other room facilities are complicated, difficult to extend and retract, and also seriously compromise the construction of the vehicle body.

Accordingly, it is an object of the present invention to provide a foldable vehicle body and bed construction in which an extendable bed, roof and wall mechanism is all pivotally connected together to extend a vehicle body for the purpose of increasing the room therein and which construction is very compact when retracted whereby the exterior of the vehicle body is compact and conventional and whereby the foldable bed structure when retracted occupies a minimum of space adjacent to a vertical wall of the vehicle body due to the fact that the normal horizontal axis of the bed when in use is disposed vertically and in closely adjacent position to the normally vertical side wall of the vehicle body, thus, occupying a small amount of space and leaving the major middle portion of the vehicle body available for other uses, such as carrying or transporting other articles, passengers or equipment.

Another object of the invention is to provide a foldable vehicle body and bed construction which may be very quickly and easily extended into a position for extending the vehicle body and providing a conventional substantially horizontal bed and mattress support means upon which a person may sleep.

Another object of the invention is to provide a foldable vehicle body and bed construction in which foldable beds may be very quickly and easily extended into position for use with a very minimum of effort.

Another object of the invention is to provide a foldable vehicle body and bed construction in which mattresses and sleeping bags or other sleeping materials may be held in the construction and securely stowed in a ready to use manner when the bed is in retracted position and during transit.

Another object of the invention is to provide a foldable vehicle body and bed construction in which one extendable wall and a roof structure is pivotally connected to a bed and mattress support, and wherein end walls are pivotally connected to a mattress support so that the end walls may be folded into horizontal position on top of the bed and mattress support, later to secure a mattress and sleeping bags or other materials in connection with the mattress support when it is stowed in the vehicle in retracted position and in normally vertical disposition.

Another object of the invention is to provide a foldable vehicle body and bed construction having a novel folding and extendable bed and mattress support, roof and side wall structures all pivotally connected together and supported by spring loaded diagonal flexible tension members, all of which provide for simple and easy extension of a vehicle body for providing sleeping facilities.

Further objects and advantages of the present invention may be apparent from the following specification, appended claims and accompanying drawings, in which:

FIG. 1 is a perspective view of a conventional pickup truck having a foldable vehicle body and bed construction thereon in accordance with the present invention, and showing one extendable bed, roof and wall structure in extended position at one side of the vehicle body and another foldable bed, roof and wall structure in retracted position at the other side of the vehicle body;

FIG. 2 is an enlarged fragmentary sectional view taken from the line 2—2 of FIG. 1 showing an extendable bed and mattress support pivotally connected to extendable side wall and roof structure and showing these elements in retracted position with respect to a side wall of the vehicle body;

FIG. 3 is a view similar to FIG. 2, but showing the bed and mattress support, extendable side walls and roof structures all in extended position wherein a bed is made available for sleeping purposes, and further illustrating by broken lines varying positions of the bed and mattress support, extendable side walls, and roof structure, thereby illustrating the intermediate positions between extended and retracted positions of the structures with respect to the vehicle body side wall; and FIG. 4 is an enlarged fragmentary sectional view taken from the line 4—4 of FIG. 3 showing by broken lines and arrows varying folding positions of extendable and pivoted end walls of the invention which are foldable horizontally into contiguous relation with the upper surface of a bed and mattress support or mattress and sleeping bag elements thereon, as the case may be.

As shown in FIG. 1 of the drawings, a conventional pickup truck 10 is provided with the usual pickup bed 12 on which is mounted a substantially box shaped, hollow body 14 having a roof 16, the usual pivoted gate or door 18 at the rear, and opposite side walls 20 and 22 from which the foldable and extendable bed construction of the invention may be operated to provide an extendable bed and mattress support together with side and end walls and a roof, it being seen that the left side of the vehicle body 14 is extended in such a manner, as shown in FIG. 1, while the right side is in retracted position. Accordingly, it will be appreciated that the right side of the vehicle, shown in FIG. 1, is substantially as illustrated, in FIG. 2, while the left side, as shown in extended position, is similar to that as shown in FIG. 3 of the drawings.

It will be apparent to those skilled in the art that the foldable bed construction may be mounted on a pickup truck vehicle body 14, such as shown in FIG. 1, or it may be mounted on a trailer body or other suitable vehicle.

Referring to FIG. 2 of the drawings, it will be seen that the vehicle body 14 is provided with a floor 24 which is disposed generally near and connected to a lowermost portion of the side wall 20 in which an opening 22 is provided, said opening 22 having an upper extremity 24 and a lower extremity 26.

Pivoted to the side wall 20 near the lower extremity 26 and the opening 22 is a hinge 28 having a substantially horizontal axis. This hinge is also connected to a bed and mattress support or floor 30 which overhangs the axis of the hinge 28 and is thereby provided with a normally inner edge 32 which is disposed below the hinge 28 when in retracted position and inwardly of the hinge 28 when the bed is in extended position, shown in FIGS. 2 and 3, respectively. The bed and mattress support 30 may be constructed in any suitable manner. It may be of plywood or other structural material. And fixed to this bed and mattress support 30 near or at an edge 34 thereof is a hinge 36. This hinge 36 is an elongated hinge having a substantially horizontal axis disposed in spaced, generally parallel relation to that of the hinge 28, and connected to the hinge 36 is an upstanding extendable side wall 38 having an upper edge 40 adjacent to which is fixed a hinge 42. Pivotally connected to the upper portion of the extendable side wall 38 by means of the hinge 42 is an extendable roof member 44 having an outboard edge 46 overlying the outer side of the extendable side wall 38 to shed precipitation therebeyond.

A hinge 50 is connected to the vehicle side wall 20 near the upper extremity 24 of the opening 22. This hinge 50 supports a normally upper edge of the roof member 44 in pivotal relation with the side wall 20, and generally suspends the roof member 44 in vertical position when retracted into position as shown in FIG. 2, wherein the outboard edge 46 of the roof member 44 moves into flush position with the outer side of the side wall 20 and coincides substantially with the lower extremity of the opening 22. Thus the roof member 44 fits into the opening 22 in substantially flush relationship with the outer side of the vehicle side wall 20. The hinge 42 holds the extendable side wall 38 in substantially parallel relation with the roof member 44, while the hinge 36 is disposed near the upper extremity of the opening 24, and holds the edge 34 of the bed and mattress support 30 uppermost while the inner edge 32 thereof is supported below the hinge 28, thus supporting the bed and mattress support in substantially vertical position in close, adjacent, substantially parallel relationship with the vertical outer side wall 20 of the vehicle body 14.

When these structures are in the extended position the hinge 28 may be termed the first hinge, the hinge 36 the second hinge, the hinge 42 the third hinge, and the hinge 50 the fourth hinge.

Fifth and sixth hinges, generally designated 52 and 54, are disposed horizontally and connected to short vertical end walls 56 and 58, respectively, extending upwardly from the bed and mattress support 30 at opposite ends thereof. These hinges 52 and 54 are pivotally connected to respective bed end walls 60 and 62, and may be pivoted downwardly for retraction, as indicated by arrows A in FIG. 4, into broken line positions 64 and 66, respectively, on top of the box shaped bed and mattress support and in contiguous relationship to a mattress 70 supported therein. Further, a sleeping bag and/or bed clothes may be positioned on the mattress and these end walls 64 and 66 may securely hold the sleeping bag and/or bed clothes adjacent to the mattress 70.

Tension cables 72 and 74 are secured by fixtures 76 to the inner side wall portion of the vehicle body near the upper extremity 24 of the opening 22 and extend through said opening. These flexible tension elements may be in the form of cables with adjustment turn buckles 78, while a tension spring 80 tends to retract the cables and serves as a shock absorber or snubber. These cables are fixed at their lower ends by fixtures 82 connected to the bed and mattress support 30 outwardly of the hinge 28 and in close proximity to the hinge 36, as shown best in FIGURES 1, 3 and 4 of the drawings.

It will be seen that the tension springs 80 tend to balance some of the weight of the bed and mattress support together with the mattress and sleeping bags or other material carried therein so that the springs substantially facilitate retraction of the bed and mattress support 30 together with the side wall 38, roof 44 and end walls 60 and 62, as will be hereinafter described.

Trunnions 84 and 86 are fixed to the roof member 44 and may be engaged by an opening 88 in an operating handle 90 to provide for leverage for pivoting the roof member 44 and the extendable side wall 38 together with the bed and mattress support to an extended position as shown in FIG. 3, or to a retracted position as shown in FIG. 2.

It will be seen that during retraction the roof member 44 must pivot upwardly in order that the hinge 42 swinging about an axis of the hinge 50 may be cleared as the bed and mattress support or floor 30 moves into retracted position through the opening 22 and into the retracted or stowed position, as shown in FIG. 2 of the drawings.

It will be obvious to those skilled in the art that various modifications of the present invention may be resorted to in a manner limited only by a just interpretation of the following claims.

I claim:

1. In a foldable vehicle body and bed construction the combination of: a substantially box shaped vehicle body; a side wall of said body having an opening therein; a bed mattress support hinged to said side wall on a substantially horizontal axis disposed near a lower extremity of said opening; a first hinge connecting said mattress support and said side wall and disposed on said substantially horizontal axis; a second hinge connected to said bed mattress support; said second hinge having an axis disposed generally horizontally and spaced relative to the axis of said first hinge; an extendable side wall; a first portion of said extendable side wall pivotally connected to said bed mattress support by said second hinge and extending upwardly therefrom; a third hinge connected to an upper portions of said extendable side wall; said third hinge having an axis disposed substantially laterally above the axis of said second hinge; an extendable bed roof member pivotally connected to said extendable side wall member by said third hinge; and a fourth hinge having a pivotal axis spaced laterally of that of said third hinge; said fourth hinge pivotally connecting said roof member to said vehicle body near an upper extremity of said opening in said side wall of said vehicle body; fifth and sixth hinges having substantially horizontal axis and connected to opposite end of said bed and mattress support, said axes of said fifth and sixth hinges also disposed at substantially right angles to axes of said first and second hinges; and first and second end walls pivotally connected to opposite ends of said bed and mattress support by said fifth and sixth hinges; said end walls thus adapted to fold downward in position adjacent to said bed and mattress support and alternately to be disposed in substantially vertical position with respect to opposite ends of said bed and mattress support.

2. In a foldable vehicle body and bed construction the combination of: a substantially box shaped vehicle body; a side wall of said body having an opening therein; a bed mattress support hinged to said side wall on a substantially horizontal axis disposed near a lower extremity of said opening; a first hinge connecting said mattress support and said side wall and disposed on said substantially horizontal axis; a second hinge connected to said bed mattress support; said second hinge having an axis disposed generally horizontally and spaced relative to the axis of said first hinge; an extendable side wall; a first portion of said extendable side wall pivotally connected to said bed mattress support by said second hinge and extending upwardly therefrom; a third hinge connected to an upper portion of said extendable side wall; said third hinge having an axis disposed substantially laterally above the axis of said second hinge; an extendable bed roof member pivotally connected to said extendable side wall member by said third hinge; and a fourth hinge having a pivotal axis spaced laterally of that of said third hinge; said fourth hinge pivotally connecting said roof member to said vehicle body near an upper extremity of said opening in said side wall of said vehicle body; a fixture on said extendable roof member; and a lever handle removably connected to said fixture for manually pivoting said bed and mattress support and extendable wall and said extendable roof member from a retracted position to an extended position and from an extended position to a retracted position.

References Cited by the Examiner

UNITED STATES PATENTS 1,431,783 10/1922 Diefenderter.
1,461,574 7/1923 Caplan.
1,857,081 5/1932 Fontaine.
2,038,001 4/1936 Redding.

FOREIGN PATENTS 1,236,538 6/1960 France.

BENJAMIN HERSH, *Primary Examiner.*

P. GOODMAN, *Assistant Examiner.*